United States Patent [19]

Welch

[11] Patent Number: 5,777,869

[45] Date of Patent: *Jul. 7, 1998

[54] RELAY LADDER CONTROL SYSTEM FOR SIMULATION AND MONITORING

[75] Inventor: John T. Welch, Akron, Ohio

[73] Assignee: The University of Akron, Akron, Ohio

[*] Notice: The terminal 23 months of this patent has been disclaimed.

[21] Appl. No.: 353,181

[22] Filed: Dec. 9, 1994

[51] Int. Cl.$^6$ .............................. G06F 19/00; G06F 9/305
[52] U.S. Cl. .................... 364/147; 364/DIG. 2; 364/926.9; 364/849; 364/946.2; 395/375
[58] Field of Search .................... 364/147, 146, 364/140, 141, DIG. 2; 395/375, 500, 800

[56] References Cited

U.S. PATENT DOCUMENTS

| | | | |
|---|---|---|---|
| 4,716,541 | 12/1987 | Quatse | 364/DIG. 2 |
| 4,802,116 | 1/1989 | Ward et al. | 364/DIG. 2 |
| 5,230,061 | 7/1993 | Welch | 364/148 X |

*Primary Examiner*—Joseph Ruggiero
*Attorney, Agent, or Firm*—Renner, Kenner, Greive, Bobak Taylor & Weber

[57] ABSTRACT

An improved method of implementing and solving relay ladder logic, such as in programmable logic controllers, more efficiently to allow greater flexibility is provided. Solving relay ladder logic is performed with scan times dependent only upon the number of input and state changes on a scan, and the resulting number of flow changes at ladder connectors. The scan time will therefore be independent of the size of the ladder. The method comprises the steps of recording the structure of a relay ladder and the current flow on the ladder via a ladder coding convention which specifies adjacent relay ladder connections for a particular diagram. Based upon input or state variable changes or events, the process of the invention will act to toggle all of the ladder contacts associated with these events between open and closed positions. This procedure is accomplished by following precomputed lists of such contacts which will be affected by a particular event or change in system model variables. Once the scan events have been posted in the ladder, the scan continues with a processing sweep which computes flow change across one column of the ladder at a time. In each column during a scan, each posted event which has been updated in the control model may be retrieved and expanded across the ladder to vertical paths of the next column to the right in the ladder. When the column sweep reaches a coil element, the changed state variable will be output and retained for the next scan calculation. The relay logic event sweep performs a left to right computation of events or changes in the input or state variables of the control model ladder flow, such that the computation will always move downstream with respect to the power flow on the ladder. This insures that flow change is not doubly calculated on the same scan, returning to an original value. The process maintains a complete record of ladder flow on every scan, and is adaptable to any relay ladder logic system, having no formatting restrictions.

8 Claims, 6 Drawing Sheets

FIG.-1

Legend
- —| |— normally open contact
- —|/|— normally closed contact
- —( )— state or output coil

RELAY LADDER CONTROL SYSTEM FOR SIMULATION AND MONITORING

FIELD OF THE INVENTION

The present invention relates generally to a relay ladder logic solver for use with programmable logic controllers (PLC), wherein full information is maintained on the power flow in the ladder to allow simulation or on-line monitoring modes of operation in which a section of the ladder flow is observed or captured for interpretation and use by the programmable logic controller.

BACKGROUND OF THE INVENTION

In logic systems, such as programmable logic controller (PLC) systems, control systems are utilized in the implementation and operation of the controller. A PLC may be utilized to operate industrial equipment or systems, and provides an integral component in manufacturing support applications. As the need for flexibility in the manufacturing processes grows, a need for a flexible and efficient programmable logic controller has developed. In current PLC designs, processors are used to implement logical control schemes, wherein programming by the user will enable customization of the control system to a particular situation as needed. An on-line control function is implemented by interpretation or translation of a design language into lower level, procedural languages which are executed by the processor. The primary function of accepted design languages is the graphic portrayal of the state of the logic model used in the on-line control function. A popular design language for PLC systems includes the relay ladder logic diagram, which provides a simplified model of the physical relay panels formerly used as the primary means of implementation of logical control rules. Relay ladder diagram developments support simple dedicated input entry keyboards, and provide easily interpreted displays of controls and output states. The control interpreter of a PLC system is based upon the relay ladder model, and updates state and output variables periodically, with all input changes during a previous cycle being handled at once. In the prior art, the relay ladder diagram relies upon techniques of discrete sequential systems, wherein to solve the relay ladder logic in a control model, scanning of the entire relay ladder logic diagram is performed. Such scanning is performed upon the occurrence of a change of an input or state variable, and the scanning time will be directly related to the size of the control model. Similarly, the length of a control program derived from the control model may also limit the speed at which scanning can occur and at which the PLC may operate. The scan times are thus dependent on the size of the relay ladder logic diagram, regardless of the input and state changes in the system.

The limitations of current PLC design relating to the speed of operation, dependent on the need to scan an entire relay ladder logic diagram upon the change of any input variable or state variable, limits the potential applications for which the PLC can be used. Improvement in the speed of operation in PLC on-line control would greatly enlarge the scope of applications of PLC's in manufacturing and other processes. As relay ladder logic diagrams are an accepted design language which is familiar to users of PLC's, there has been found a need to improve processing characteristics of a control system using the relay ladder diagram and to increase the speed at which the PLC may operate. Various prior art patent literature relates generally to PLC design and attempts to increase the speed of operation and implementation of a relay ladder logic diagram. For example, in U.S. Pat. No. 4,021,783, a PLC utilizes a microcontroller and an associated instruction set for implementation of ladder logic. After the relay ladder logic diagram has been translated into a control program, the microcontroller will repeatedly execute this program to scan. In this way, the PLC operates on-line by scanning the control program. A double-buffered input system adapted to record events in isolation from a ladder scan may be used to increase speed of operation independent of a ladder scan.

In U.S. Pat. Nos. 4,244,034, 4,247,901, and 4,247,909, there is described a special purpose hardware device for an on-line relay ladder logic system. The hardware effects a sequential scan of the entire ladder model on each cycle of operation. A programming panel is provided for entry of a coded description of the ladder into memory, that description being compatible with the scanning sequence of the system. The entry of ladder symbols is guided, following the same order of entry as the sequencing of contacts followed by the digital hardware in the on-line relay ladder logic system.

In U.S. Pat. No. 4,227,247, there is described an improvement of a relay ladder coding system which represents the ladder by a series of instructions that must be re-interpreted on every scan of the ladder. This system requires a traversal of the entire control model on every cycle. Each instruction of the sequence corresponds to a contact or a coil of the ladder diagram, wherein the improvement is to provide for storage values at junction points which allow a more general form of the ladder to be represented. No provision is made for bypassing any of the logic in the ladder diagram, and scan times will thus be based upon the size of the ladder which greatly slows operation of the system.

The prior art methods of implementation of a relay ladder logic diagram, wherein scan times are dependent upon the size of the ladder can preclude real time operation of a PLC system. For more demanding PLC applications, solving techniques for the relay ladder logic based upon changes of input and state variables, with scanning of the entire ladder, will preclude on-line implementation and limits the flexibility of the PLC system.

SUMMARY OF THE INVENTION

Based upon the foregoing, the invention provides an improved method of implementing and solving relay ladder logic in programmable logic controllers more efficiently to allow greater flexibility. The present invention therefore offers an efficient and effective method for solving relay ladder logic, with scan times dependent only upon the number of input and state changes on a scan, and the resulting number of flow changes at ladder connectors. The scan time will therefore be independent of the size of the ladder. The method of the invention may be referred to as the relay ladder logic event sweep, which differs from prior art methods in that full information is maintained on the power flow in the ladder. The method is therefore appropriate for simulation or on-line monitoring modes of operation in which a section of the ladder flow is being observed or captured for interpretation. The main object of the invention is therefore to provide a method for solving and implementing relay ladder logic in programmable logic controllers, which overcomes the deficiencies of the prior art.

Another object of the invention is to provide an on-line system which operates in real time giving greater flexibility to a PLC system and allowing a PLC system to be used for a variety of different and more demanding applications.

Another object of the invention is to provide an on-line programmable control system which implements a relay ladder logic model on-line, and is suitable for applications in which on-line ladder display is required.

Yet another object of the invention is to provide a relay ladder logic event sweep, wherein full information is maintained on the power flow in the ladder, to allow simulation or on-line monitoring modes of operation in the PLC system.

Still another object of the invention is to provide a method for on-line control of a PLC system using a conventional microprocessor device while providing more efficient and effective performance.

Still another object of the invention is to provide a method for relay ladder logic solving which will continuously identify ladder flow information on a contact by contact basis, and will allow a maintenance of one or more displays of the current status of ladder rungs, based on the ladder representation being used for solving the ladder logic.

These and other objects of the invention are accomplished by means of a method comprising the steps of recording the structure of a relay ladder and the current flow on the ladder via a ladder coding convention which specifies adjacent relay ladder connections for a particular diagram. In the relay ladder representation formed by the ladder coding convention, the relay ladder is represented as a rectangular array of cells, each of which consists of at least one connector and a contact element. The connectors and elements of each cell, along with the relative locations of the cells will define the geometry of the ladder. Each relay contact associated with each cell will be either a normally open or normally closed contact, and each contact will be associated with a Boolean variable. The associated Boolean variable may be either an input variable or a state variable of the PLC system, and provides the basis for logic determinations and flow in the ladder. As an example under a typical ladder coding convention, the normally open contacts will be open when an associated variable is false, and closed when the associated variable is true. The event sweep process of the invention relies upon implementation of the logical functions contained in the ladder with processing only depending upon the extent of the implication of input variable changes or state variable changes in the system. The "event chaining" implementation will update the state and output variables of the control system in a time proportional to the number of input events and resulting state transient events. The event chaining process will maintain the state of a system model by propagating input changes through the model. processing only the chains of events rather than the entire model. The event sweep process will compute all changed flow throughout the ladder, without processing parts of the ladder whose flow is not effected by the scan events. In this way, the implementation of the control scheme based upon changes in events in the system model variables will make solving of the ladder independent of the size of the control model.

Based upon input or state variable changes or events, the process of the invention will act to toggle all of the ladder contacts associated with these events between open and closed positions. This procedure is accomplished by following precomputed lists of such contacts which will be affected by a particular event or change in system model variables. Once the scan events have been posted in the ladder, the scan may continue with a processing sweep which computes flow change across one column of the ladder at a time. In each column during a scan, each posted event which has been updated in the control model may be retrieved and expanded across the ladder to vertical paths of the next column to the right in the ladder. When the column sweep reaches a coil element, the changed state variable will be output and retained for the next scan calculation. The relay logic event sweep performs a left to right computation of events or changes in the input or state variables of the control model ladder flow, such that the computation will always move downstream with respect to the power flow on the ladder. This insures that flow change is not doubly calculated on the same scan, returning to an original value. The process maintains a complete record of ladder flow on every scan, and is adaptable to any relay ladder logic system, having no formatting restrictions. The speed improvement of processing allows ladder support with a standard microprocessor, integrated with word level functions such as counters, timers, arithmetic processors or other peripheral devices. The invention allows solving of the relay ladder to be performed more efficiently and the process will update display information on a continuous basis.

BRIEF DESCRIPTION OF THE DRAWINGS

These and other objects and advantages of the invention will become apparent upon a further reading of the detailed description of the invention in conjunction with the drawings, wherein.

DETAILED DESCRIPTION OF THE INVENTION

Figure 1:
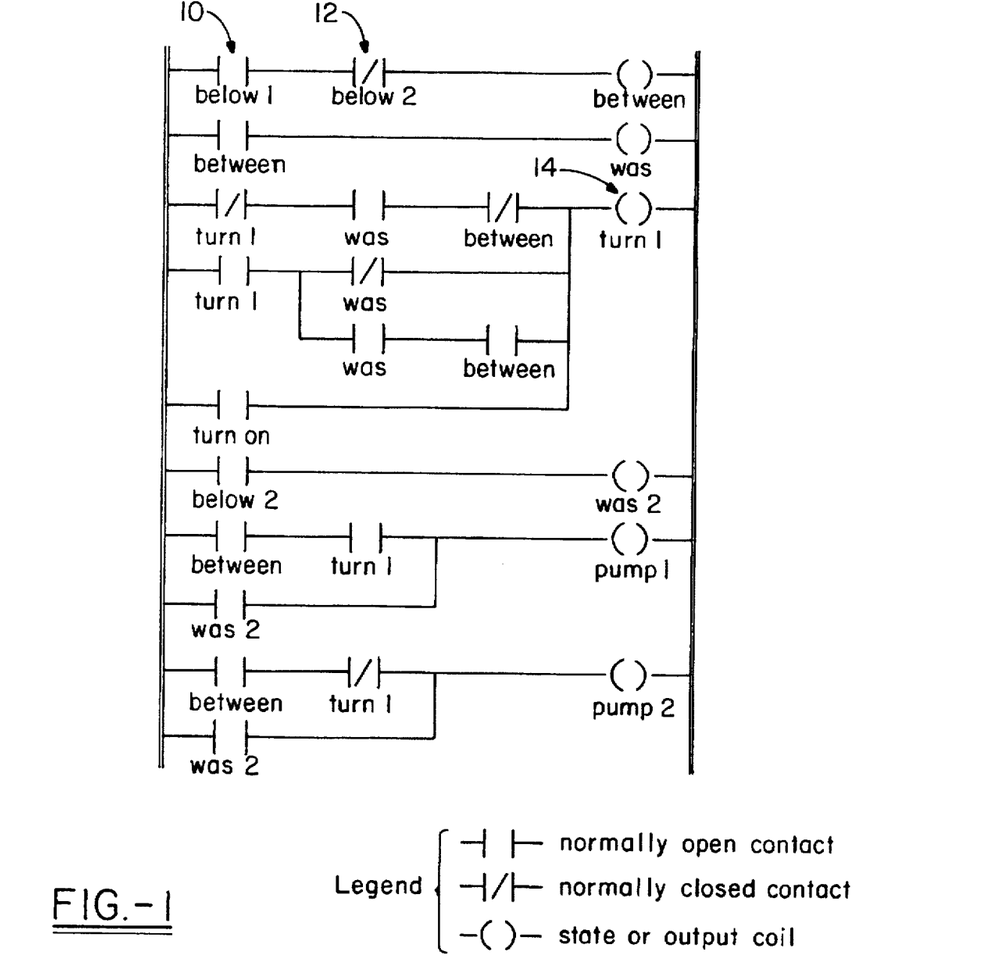
FIG. 1 is an example of a relay ladder diagram.

Turning now to the figures, the invention will be described in more detail. As seen in FIG. 1, a typical relay ladder logic diagram provides a graphic analog in software of a relay panel, corresponding to hardware which preceded computer systems as a programmable discrete logic device in industrial control systems. Programmable logic controllers are discrete control development systems which provide for entry, editing and simulation of control models, and implement them on line. The relay ladder logic diagram continues to be the most widely offered PLC modeling language available. The PLC model provides the user defined sequential logic machine having imbedded arithmetic operations, timers and counters. Conventionally, relay ladder programming has assumed a form of ladder solving which emulates a synchronous sequential machine. In this form, each scan of the ladder computes the contribution of the synchronous machine's combinational network on a single clock cycle. As seen in FIG. 1, a simple example of a relay ladder logic control system is shown, which solves a control problem wherein two identical pumps are used to maintain the water level of a reservoir. In such a system, two water level sensors provide inputs to the control system, corresponding to "below1", and "below2", which are indicated as TRUE when the level of the fluid is below the respective sensors in the reservoir. A control system is adapted to have both pumps on when the level is below the lower sensor and both pumps off when the level is above the higher. When the level is between the sensors, the system is to keep one pump on, alternating the pumps on successive entries into the "between" region. The basic components of relay ladder logic as seen in FIG. 1, comprise a vertical rail to the left, which supplies power (is "hot") to all crossing rungs of the ladder. The power flows from left to right only, taking vertical paths where provided. Contacts which emulate contacts of a relay panel are provided along the rungs, and may interrupt the "hot" flow in the system. The contacts are controlled by inputs such as the "below1" and "below2" in this example, and by stored state variables. A label under each contact identifies the controlling value. In the relay ladder logic diagram, a normally open contact is represented as shown at 10, while a normally closed contact is shown at 12. A state or output coil of the relay ladder is represented at 14. The normally open contacts 10 will terminate a "hot" path when the controlling value is FALSE, while the normally closed contacts 12 will terminate a "hot" path when the controlling value is TRUE. The state or output coils 14 in the relay ladder diagram are representative of Boolean state and output variables of the relay ladder controller and are typically confined to the rightmost column of the ladder. The value of the state or output variables are considered TRUE while a "hot" path reaches the coil and control contacts in the ladder. The values of the state and output variables may also be available as outputs from the system. Other coil variables, such as "pump1" and "pump2" are used only as outputs from the system. The ladder topology as shown in FIG. 1 is a direct graphic analog of combinational gate logic, wherein contacts in series represent the AND operation, and parallel flow branching represents the OR operation. The normally closed contacts 12 implement the NOT operator and complemented variables. The sets of rows feeding a single coil, such as those feeding the coil variables "pump1" or "pump2", which may be referred to as rungs of the ladder diagram or networks, are equivalent to logical equations. These rungs may also be interpreted as "if and only if" rules for the coil variables.

In conventional implementation of a relay ladder logic diagram in use with a programmable logic controller, the performance of the PLC will be characterized by the scan time required to recompute ladder flow for a new set of input values to the ladder diagram. This implementation may emulate a synchronous digital circuit if the contacts of the ladder diagram set by input state variables are held constant while ladder flow is recomputed. The relay ladder logic diagram provides data for an interpreter which is executed by the on-line control processor of a PLC system, or the ladder diagram is incorporated into a machine language program implemented by the processor. Additionally, it assumed in the ladder logic diagram that timers, counters and arithmetic registers and operations are external to the logical rules defined by the ladder diagram. A timer's output, for example, is considered as an input to the relay ladder logic, whereas timer logic inputs, which reset the timer and/or allow it to run, are treated as output coils of the relay ladder.

Figure 2:
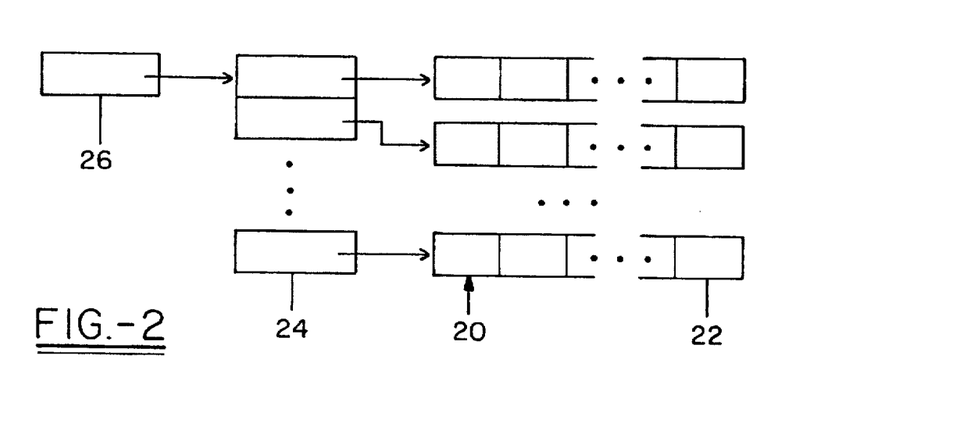
FIG. 2 shows a possible data structure for a relay ladder logic array.

Turning to FIG. 2, there is shown a possible data structure which records the structure of a relay ladder model as well as the current power flow on the ladder. The relay ladder is stored in this data structure as a dynamically allocated rectangular array of cells generally indicated at 20. Each cell 22 describes a contact or coil element and its left connector, with the contents of a ladder member 22 defining the geometry of the ladder. The ladder array also includes row pointers 24 and a ladder pointer 26. Although the relay ladder structure shown in FIG. 2 is one form of ladder storage with which the invention may be used, it should be understood that the invention is also adaptable to other forms of ladder storage as may be desired.

The possible connector and element values forming the contents of a ladder member 22 are shown in the following Table 1, with the connectors and elements, along with the relative locations of cells in the array of cells 20, defining the geometry of the ladder.

TABLE 1

| Connector | ·, ⊤, ⊢, ¹, ⊣, etc. |
|---|---|
| Element | ⊣⊢, ⊣/⊢, —, -( )- |
| Inhot | HOT, COLD |
| Closed | CLOSED, OPEN |
| Listed_at | Row Number |
| Next | Row Number |
| Count Pointer | |

Figure 3:
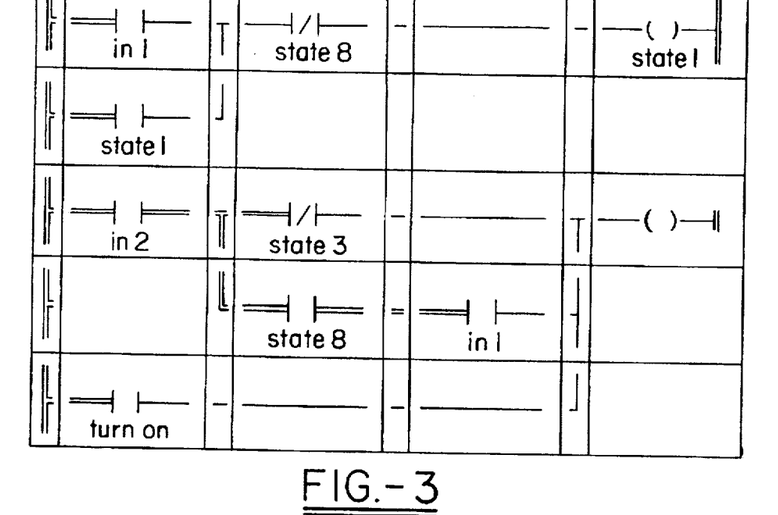
FIG. 3 shows the connectors and elements, along with the relative locations of cells, defining the geometry of a ladder diagram.

In the above table, the connectors and elements as illustrated and the relative locations of cells in the array 20 may be used to depict the ladder diagram in a manner illustrated in FIG. 3. FIG. 3 shows "tiles" defined directly by cell contents, which make up a relay ladder diagram as drawn on a monitor screen display or on paper. The method of the invention is an optimally efficient method of relay ladder solving, being a repeated recomputation of left to right "flow" on the ladder that defines the current logic state of the model. In relay ladder logic, a state coil variable is TRUE on a cycle when an unbroken flow path exists on the previous cycle flow from the "left rail", being the leftmost column of the connectors across the coil cell representing the variable. In the ladder representation as shown in FIG. 2, the ladder flow is represented by one variable in each ladder cell 22. As given in Table 1, the Boolean cell variable "inhot" may be HOT or COLD, and when this Boolean variable is HOT or energized, there is flow entering at the left connector of the cell. In the present invention, the method updates the "inhot" variables to define a new ladder flow, given new input and state variable values for a model cycle. The "element" variable in a ladder cell determines the element type, for example a contact, bar connection, or coil. Cell fields thus define ladder topology, contact state, and input flow at the connector (i.e., inhot). Included also is a pointer to a symbol table entry containing attributes of the label variable, such as name text and its list of associated contacts. A ladder row is defined as a fixed length array of such cells. Each relay contact is either a normally open or normally closed contact, and each contact is associated with a Boolean variable, either an input variable or a state variable of the model. Normally open contacts are OPEN (i.e. stop flow) when the associated variable is FALSE, and CLOSED (i.e. transmit flow) when the associated variable is TRUE. Normally, closed contacts are CLOSED when the associated variable is FALSE, and OPEN when it is TRUE. For on-line solving, the repeated computation of left to right "flow" on the ladder provides that coils should be moved in the ladder arrays to the immediate right of the last contact or return connector on their respective rungs.

The method of the invention performs computation of ladder flow by the event chaining technique, wherein events are changes in the system model variables. Event chaining maintains the state of a system model by propagating input changes or events through the model, and processing only the chains of events rather than the entire model. This processing technique may be referred to as the "event sweep", and computes all change flow throughout the ladder, without processing ladder flow not effected by change in input and state variable values.

Figure 4:
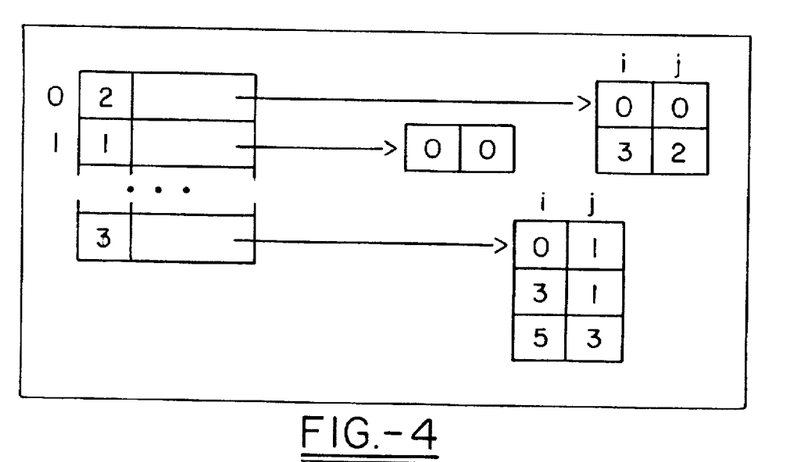
FIG. 4 shows an example of precomputed lists of contacts for each variable of a relay ladder diagram for use in the method of the invention.

A "scan", or update of ladder flow, with a given set of input and state events to be propagated through the model, is performed in two stages. In a first stage, all of the ladder contacts associated with events are toggled between OPEN and CLOSED. This may be performed by following precomputed lists of such contacts, one for each variable in the ladder array. An example of precomputed lists of contacts for each variable of the ladder array are shown in FIG. 4. An index associated with a variable selects a member of an array, which in turn contains the number of contacts and a pointer to the dynamically allocated ladder array 20, giving the ladder coordinates of the contacts. Thereafter, in the second phase of the scan, changes in ladder flow are computed and recorded as changed "inhot" values in cells of the ladder array. A contact toggle will cause a flow change only when its left connector is HOT. From a HOT contact toggle, the event chaining solver propagates flow changes rightward and vertically in the ladder until the changes terminate. In this manner, recalculation of flow is avoided by generating flow changes "downstream" from a predetermined starting point. In relay ladder logic, downstream is defined as left to right with flow changes propagating up and down vertical connections between ladder rungs. This left to right solving order is maintained in the present invention by keeping a set of event (change) lists, with one set for each ladder column. The event list is an array of row numbers, with an associated number of events posted to the list, with a possible structure for the set of lists shown in FIG. 5. In the method of the invention, the event lists are interrogated on a scan to maintain left to right flow in the ladder. As hereinafter described, two event lists may be maintained for each column. One list records contact closings, while the other records contact opening events.

In the method, as contacts are first toggled, those with HOT inhot values are added to their corresponding event lists for additional processing. As will be hereinafter described, the subscript value of the event list entry is also written to the listed_at field of the cell within the ladder diagram. Thereafter, processing of an event list entry in the second phase of the method is initiated with computation of the changed flow value to be carried to the next cell to the right in the ladder diagram. The flow value is HOT if the current cells inhot value is HOT and its closed variable is CLOSED. The next step is then to propagate the flow up and down along any series of vertical connections which include the right neighboring cell. For convenience, this shall be referred to as the "span" of the contact. Along a span, propagation of flow firstly requires a determination of whether the changed input value will actually change the flow on the span. Such changes may not occur because of flow from other rungs of the ladder into the span. Thereafter, the vertical flow value is to be changed at each connector along the span. Four combinations of input change and existing span value are shown in Table 2 below, with case "C" forming an impossible combination.

TABLE 2

| (A) Propagate | ⇥⊦⇤ |
| (B) Terminate | ⇥⊦⇤ |
| (C) Impossible | ⇥⊦⇤ |
| (D) What to do? | ⇥⊦⇤ |

—HOT
—COLD

In Table 2, the HOT contact is designated by a double line, with COLD contacts shown by a single line. In the possible combinations represented in cases (A), (B), and (D), cases (A) and (B) are immediately known. In combination (A), the newly HOT flow is to be propagated along the span, while in (B) the flow change along the current path is terminated. In case (D), the connectors along the span permitting inputs from the left could be polled to determine if other sources of HOT flow exist. Such polling action during the on-line ladder solving is avoided by maintaining a count of current incoming HOT flows for each vertical span of the ladder. The count pointer field of the ladder cell, which gives the address of the HOT count for the contact's right span shown in Table 1. Space within the cells for the counts are allocated, and pointer field values are set, as the ladder model is loaded into memory prior to on-line operation.

Figure 5:
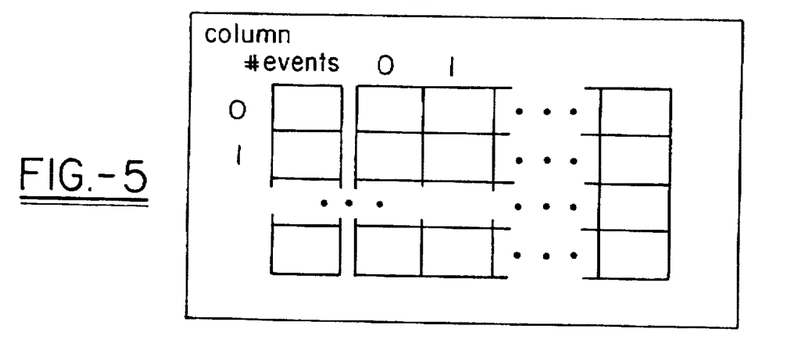
FIG. 5 shows an example of an event list used in the method of the invention.

With the addition of the span count, the (D) event is handled by decrementing the counter and testing the result. If the result is zero, propagation of the HOT to COLD event up and down the span is performed. A non-zero value would terminate flow changes at the contact being opened. To maintain the span counter used in case (D), for cases (A) and (B), incrementing of the span count is required. As their remains the possibility that a contact opening may "cool" a contact span, while another contact closing on the same scan might "heat" the span again, this form of polling action can be avoided by processing contact closings before contact openings. To accomplish this, the event lists of FIG. 5 are divided into "closing" and "opening" lists. All closing events on a column are processed before any opening events. The "heating" of a span, and "cooling" of the same path on the same span cannot occur, because once a supplying contact is closed, it won't be opened on the same scan.

In further span processing, the span will be processed by changing "inhot" fields. The "next" field of the ladder cell as shown in FIG. 2, provides a guide for the traversal of the span with a minimum of loop control testing. As the ladder model is loaded into memory prior to on-line operation, a circular list of span member rungs is embedded in the "next" fields of span members. This list is then followed, terminating when the original rung number is encountered again.

Figure 6:
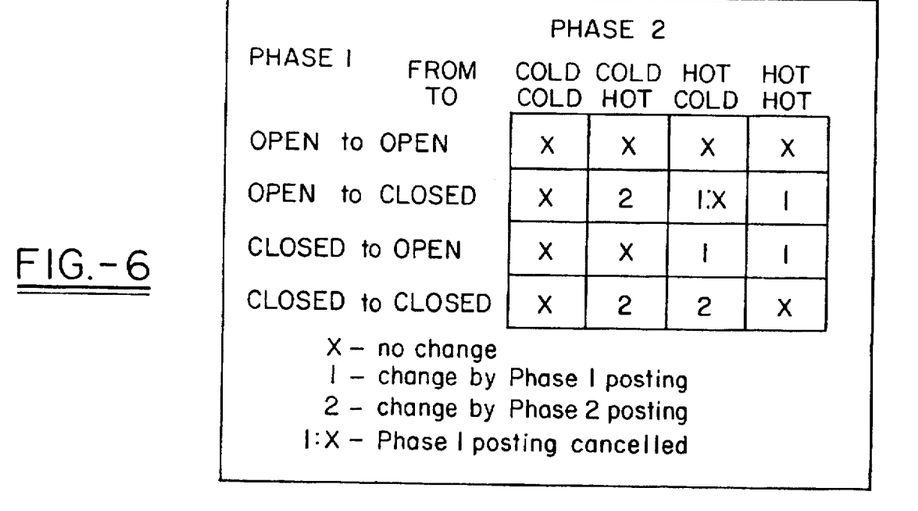
FIG. 6 shows a tabulation of cases governing the process of updating an event list as shown in FIG. 5.

As span member inhot fields are changed, additional changes are added to the event list similar to FIG. 5 in the embedding column. Further, some changes recorded in an event list in phase 1 of the scan will be cancelled. In FIG. 6, a tabulation of cases governing updating of the event lists are given, with the entries representing the desired combined effect of event list postings, such that every event list entry represents a correct flow change when it is processed. In FIG. 6, postings occur in phase 1 of the method when the inhot field of a toggled contact is HOT, such as shown in the middle rows and last two columns of FIG. 6. Thereafter, when changing the inhot values of a span in phase 2 of the method, the new changes will be registered in three out of the four cases shown in FIG. 6, in which the contact is closed. From FIG. 6, it is noted that an exception occurs when the span change is HOT to COLD, such that there is no change in the COLD input being delivered to the contact span. In this case, it is desired to remove the entry generated from the OPEN to CLOSE event from the event list. Thus, in this case, OPEN to CLOSE event postings are accompanied by the posting of a subscript of the event list entry to the list__at field of the cell, as shown in Table 1. Thereafter, in the case of HOT to COLD span value change in phase 2 of the method, those cells with non-zero list__at fields are processed by using a non-zero value to access the event list entry and change it to sentinel value, indicating a cancelled change. At the same time, the list__at value is reset to zero, for later scans.

With the mechanisms described above, a series of flow changes can end when it merges with another such that the combined flow is unchanged. A series can also end when it encounters other contacts toggled on the the changed flow the changed flow reaches a coil, the corresponding state value is changed accordingly. The change takes effect on the next cycle flow in the initial toggling of associated contacts in phase 1 of the method. Also by these mechanisms, the solving of the relay ladder using event chaining where the organization of computations is such as all changes are covered and only changes are processed, avoids double toggling of the flow. The method provides for on-line control of relay ladder systems with simulation and monitoring requirements. The method maintains a complete record of ladder flow on every scan, and is adaptable to any relay ladder logic system. Speed improvement provided by the method allows ladder support with a standard microprocessor, which may be integrated with word level functions such as counters, timers, and arithmetic processors.

Figure 7:
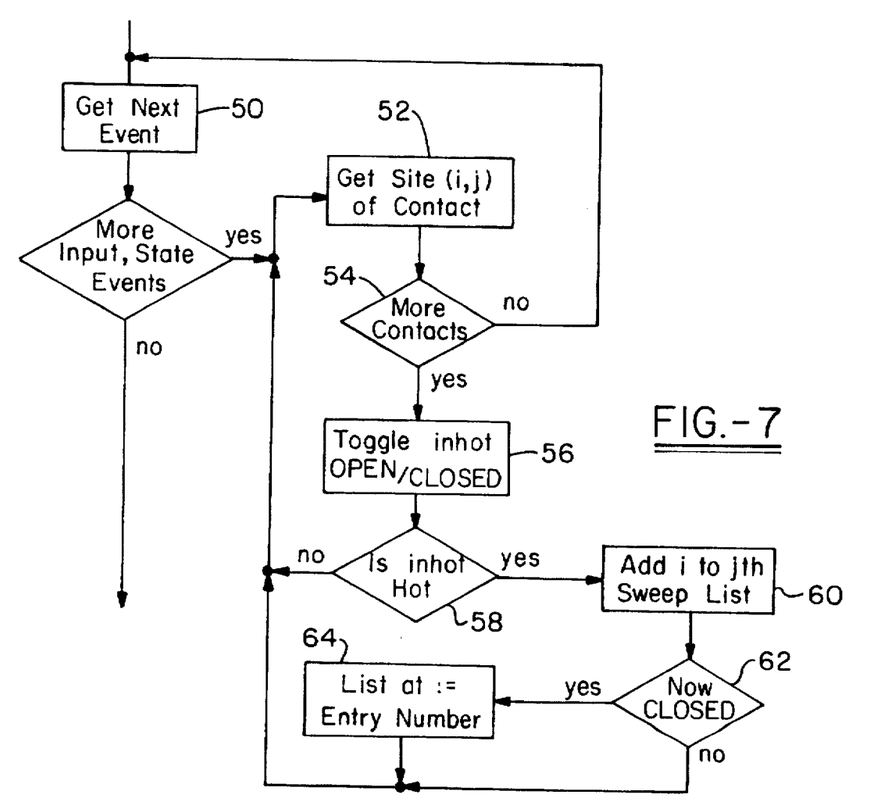
FIG. 7 shows a flow diagram of an initial phase of the method to toggle ladder contacts associated with input events.

As previously indicated, the method comprises a first phase wherein toggling of event contacts is performed, and a second phase wherein flow and outputs are updated for collection of input events. The initial phase of the method is shown in FIG. 7, for a scan or update of ladder flow, given a set of input and state events. In phase 1, the determination of whether more input or state events are present is made at step 50, with the ladder coordinates of a contact then being determined following the pre-computed contact lists as shown in FIG. 4. The contact list includes an index associated with the variable to select a member of an array, which contains the number of contacts and a pointer to the dynamically allocated array representing the ladder at step 52. This is performed for all contacts affected by the input or state event at step 54. For each of the identified contacts, the inhot value is toggled between OPEN and CLOSED at step 56 and it is then determined whether the inhot value is HOT at 58. Those contacts with HOT inhot values are added to their corresponding sweep lists at step 60, and the subscript value of the sweep list entry is also written to the listed__at field of the cell 64 to recognize the OPEN to CLOSED event postings in phase 2 of the method to remove the entry from the sweep list.

Thereafter, processing of a sweep list entry in phase 2 of the method begins with computation of the changed flow value to be carried to the next cell to the right starting in the left-most column of the ladder at 100. If more columns are present at 102, it is determined whether the event being processed acts to heat a contact span at 104, wherein if so, the heating entries are processed at 106. Further detail of processing of heating entries will be described with reference to FIGS. 9 and 10. Alternatively, if at 104, processing will not result in heating entries, it is determined at 108 whether processing will result in cooling entries. If so, processing of cooling entries occurs at 110, with more detail of this processing described in FIGS. 11 and 12. Additionally in phase 2 of the method, after processing of heating entries at 106, another determination is made as to whether a further processing would result in cooling entries at step 112, with processing of cooling entries performed at step 110 if this determination is positive. If the determination of heating entries at step 104 is negative, and the determination of cooling entries is also negative at step 108, update of flow and outputs is completed. Alternatively, if heating entries are encountered and processed at 106, and no further cooling entries are present at step 112, the processing continues with the next column in the ladder diagram at step 114 until all columns of the ladder are processed. Processing of a sweep list entry in this manner avoids the possibility that a contact opening may cool a contact span, and thereafter a contact closing on the same scan would heat this span again. All closing events on a column are processed at 106 prior to any opening event at step 110 to avoid polling in the processing.

Figure 8:
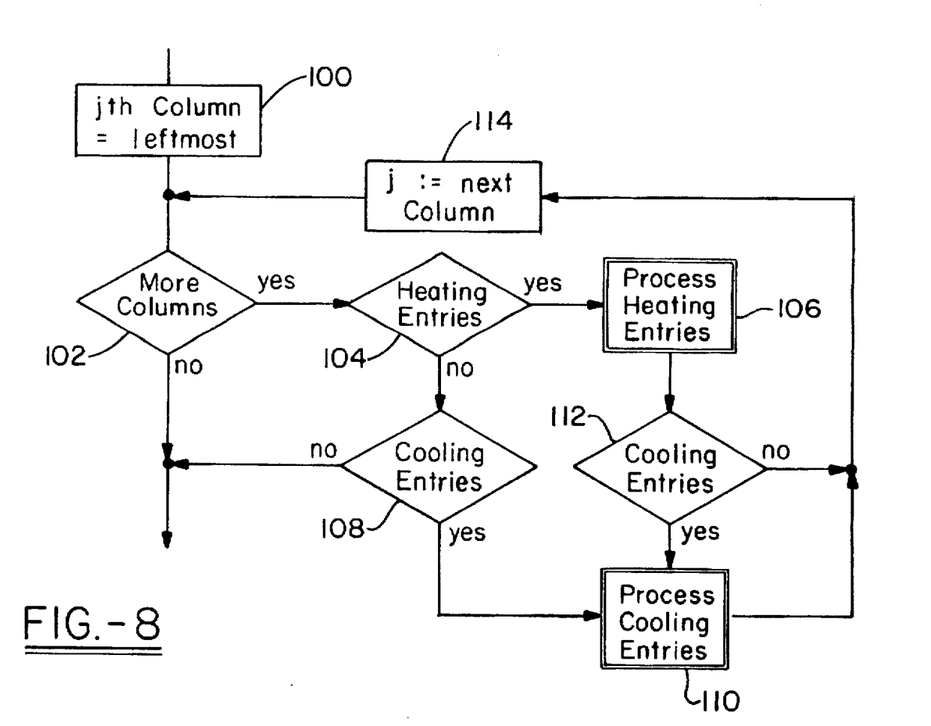
FIG. 8 shows a flow diagram of a second phase of the method to update flow in the ladder diagram.
Figure 9:
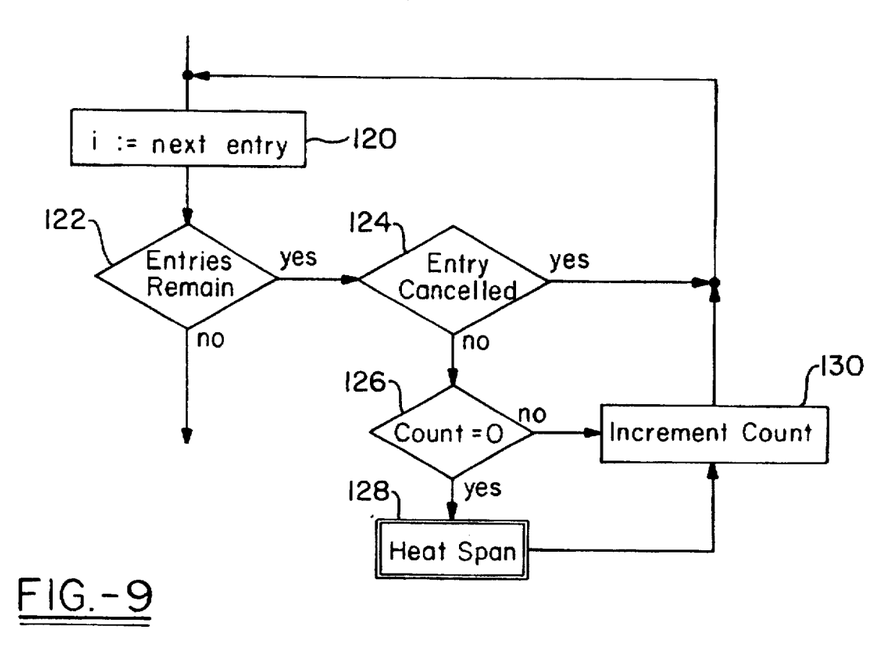
FIG. 9 shows a flow diagram of the procedure to process heating entries in the second phase of the method.

In FIG. 9, processing of heating entries at step 106 of FIG. 8 will be further described. Processing of a heating sweep list entry encountered begins at 120, with a determination of whether entries remain at 122. If sweep list entries remain, it is determined whether the entry is cancelled at 124, which, if so, leads to processing of the next entry at 120. If the entry is not cancelled, a determination of whether the count equals zero is made at 126. If the count is zero, propagation of the HOT to COLD event up and down the span is performed at 128. After propagation of the event up and down the span, the counter is incremented at 130 and the next entry is processed if any entries remain. Alternatively, if the count is non-zero, flow changes at the contact being opened would terminate and the counter would be incremented at 130 and further entries processed accordingly.

Figure 10:
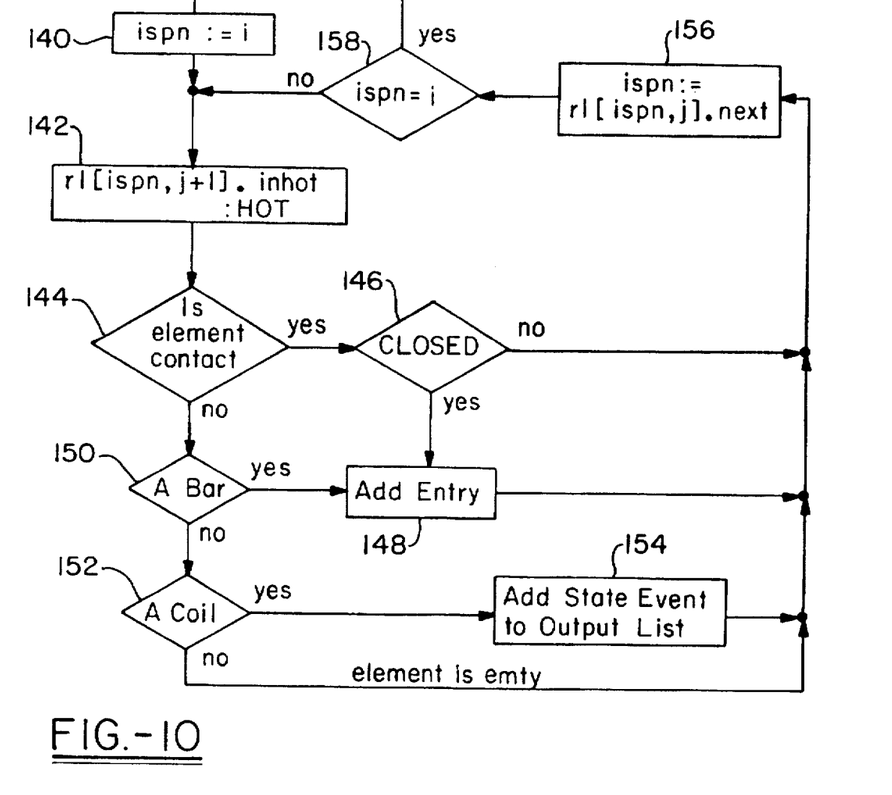
FIG. 10 shows a flow diagram of the procedure to heat a span as part of the procedure shown in FIG. 9.

In FIG. 10, the detail of heat span at 128 in FIG. 9, is given, with span changes initially being processed for each connector of the span at 140. Processing is performed with the inhot field changed at 142. As previously mentioned, a series of flow changes can end when processing encounters other contacts toggled on the same scan. At 144, if the element is a contact, it is then determined whether the contact is CLOSED at 146, and if so, the entry is added to the sweep list of the next column, as shown at 148. Similarly, a series is continued when changed flow reaches a bar at 150, with flow changes being entered on the sweep list of the next column at 148. When the changed flow reaches a coil at 152, the corresponding state event is changed and added to an output list at 154. The row index of the current element along the span is advanced at 156, to maintain left to right solving and compute all changes in ladder flow until processing along the span is completed at 158. Ineffectual recalculation of flow is avoided by generating flow changes left to right, with flow changes propagating up and down vertical connections between ladder rungs. Subsequent to calculation of changed flow along the span, input events are collected for subsequent scans accordingly.

Figure 11:
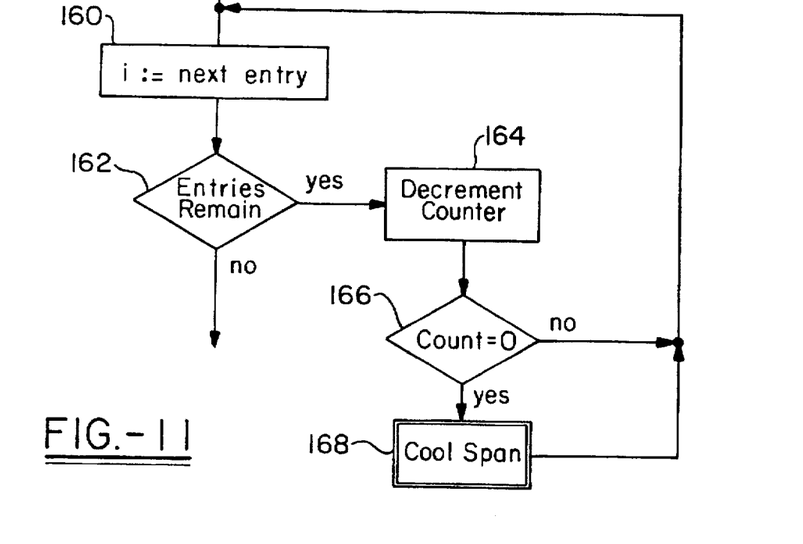
FIG. 11 shows a flow diagram of the procedure to process cooling entries in the second phase of the method.

In FIG. 11, detail of process cooling entries at 110 in FIG. 8 is given. Processing of cooling sweep list entries begins at 160, with interrogation of the next sweep list entry, and if entries remain at 162, the counter is decremented at 164. If decrementing the counter at 164 produces a zero value at 166, processing to cool the span at 168 is performed, or alternatively if the counter is non-zero, processing continues for the next sweep list entry.

Figure 12:
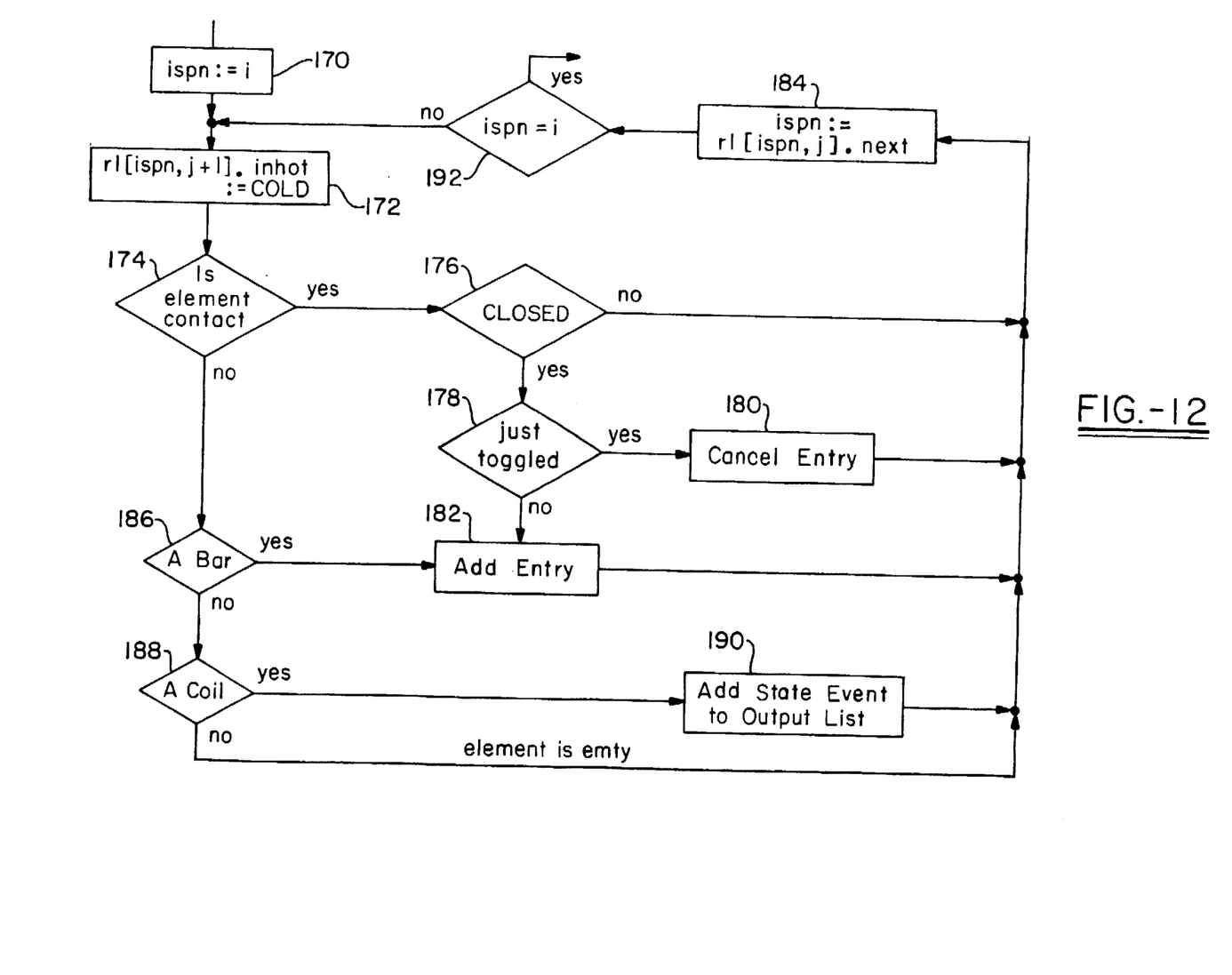
FIG. 12 shows a flow diagram of the procedure to cool a span as part of the procedure shown in FIG. 11.

Detail of the cool span processing at 168 in FIG. 11 is shown in FIG. 12, with span changes processed for each connector of the span at 170. Processing is performed with the inhot field changed at 172 for propagation of a HOT-TO-COLD event up and down the span. In span processing, an encounter with a contact at 174 will lead to a determination of whether the contact is CLOSED at 176. If the contact is closed at 176, it is determined whether it has been toggled at 178. To eliminate reverse polling, wherein heating and cooling of a vertical path could occur on the same scan, if a contact has been previously toggled during the scan as determined at 178, any entry to the associated sweep list is cancelled at 180. If the contact has not been previously toggled during the scan, the entry is added at 182 to the sweep list of the next column, and left to right flow change on the ladder continues at 184. Similarly, a series is continued when changed flow reaches a bar at 186, with flow change being entered by addition of entries at 182 to the sweep list of the next column at 184. When the changed flow reaches a coil at 188, the corresponding state event is changed and added to an output list at 190. The row index of the current element along the span is advanced at 184, to maintain a left to right solving and compute all changes in ladder flow along the span. Processing continues until the span has been traversed at 192 after all changed flow has been calculated, and input events are collected for subsequent scans.

From the foregoing, the present invention is seen to provide processing input or state variable changes in a ladder diagram for on-line solution thereof by the event-sweep procedures described, using event chaining techniques wherein the present state of a system model is maintained by propagating input changes through the model and processing only the chains of events rather than the entire model. A single scan will compute all changed flow through the ladder without processing parts of the ladder whose flow is not effected by the scan events. After scan events have been posted, the scan continues with the processing sweep which computes flow change across one column of the ladder at a time by the methods described, until the column sweep reaches the right side of the ladder, or the column event lists become empty. All changed state values or coils in the ladder are output and retained for the next scan calculation. The computation of flow changes is always moving downstream with respect to the power flow on the ladder. This assures that flow change is not doubly calculated on the same scan which may return the coil to an original value. The method allows maintenance of a complete record of ladder flow on every scan, and is adaptable to any relay ladder logic system, having no formatting restrictions. The event sweep belongs to the class of event chaining methods, in that only flow changes in the ladder are traversed, while full flow update is maintained. A list of state and pure output events is also maintained.

Having described the invention in detail with reference to the preferred embodiment thereof, it will be apparent that other modifications and variations are possible without departing from the scope of the invention as defined in the appended claims.

What is claimed is:

1. A method of implementing and solving relay ladder logic comprising the steps of:

providing a relay ladder diagram;

recording the structure of said relay ladder diagram by means of a ladder coding convention which specifies adjacent relay ladder connections in said diagram, represented as an array of cells, each of said cells comprising at least one connector and at least one contact element, wherein said at least one connector and at least one contact element of each cell along with the relative locations of said cells define the geometry of said diagram, and each of said contact elements being associated with a variable of a logic system;

processing a set of input and state events by toggling all ladder contacts associated with said events between open and closed positions by following precomputed lists of contact coordinates identifying the location in said diagram of contacts effected by a change in said input or state event; and computing changes in ladder power flow by propagating flow changes within said diagram, wherein, no processing is performed on relay ladder structure on which power flow does not change, and wherein no flow change is reversed during a current scan.

2. The method as defined in claim 1, wherein, said relay ladder diagram comprises a plurality of columns providing a plurality of vertical paths, and said step of computing changes in ladder power flow includes propagating flow changes across one column of said ladder diagram at a time from left to right until said changes terminate.

3. The method as defined in claim 2, wherein, a list of contact closing events and a list of contact opening events are both maintained for each ladder column, with all closing events being processed before any opening events, such order preventing changing flow more than once on the same scan.

4. The method as defined in claim 2, wherein, a count of the number of HOT inputs is maintained for each vertical path in said relay ladder diagram, such count being accessible by means of a pointer within the ladder element of each contact feeding flow to said vertical path, so as to allow the effect of a change in input flow to be determined without search along said vertical path.

5. The method as defined in claim 2, wherein, a field within each ladder cell with a connector along a path lists a next cell on the path, such fields defining a circular list whereby processing of the path does not involve testing for the ends of the path.

6. The method as defined in claim 3, wherein, a field is included in each ladder cell to locate the position of any posting to the closing event list of the same column, such field enabling the closing event to be cancelled if the vertical path feeding the contact is changed from HOT to COLD.

7. The method as defined in claim 1, wherein, a count of HOT inputs, accessed from any input, determines if a changed input flow value changes flow on a span within said ladder diagram, said span being a series of vertical connections within said relay ladder diagram, and said step of computing changes in ladder flow uses a span counter for each span in said relay ladder diagram, returning flow to higher rungs within said diagram, including a pointer within each ladder cell for each contact directly feeding said vertical path, said counter structure indicating the presence of alternative sources of flow without searching during said step of updating ladder flow.

8. The method as defined in claim 7, wherein, each of said cells in a span includes a predetermined field, which together provide a guide for traversal of the span with a minimum of loop control testing, with processing of the span terminating when an originating cell is encountered during processing.

* * * * *